US008345055B2

(12) United States Patent
Lu

(10) Patent No.: US 8,345,055 B2
(45) Date of Patent: Jan. 1, 2013

(54) IMAGE DISPLAY DEVICE

(75) Inventor: Ming-Hsun Lu, Taipei County (TW)

(73) Assignee: Princeton Technology Corporation, Hsin Tien, Taipei County (TW)

( * ) Notice: Subject to any disclaimer, the term of this patent is extended or adjusted under 35 U.S.C. 154(b) by 556 days.

(21) Appl. No.: 12/650,376

(22) Filed: Dec. 30, 2009

(65) Prior Publication Data

US 2010/0164982 A1 Jul. 1, 2010

(30) Foreign Application Priority Data

Dec. 30, 2008 (TW) ............................... 97151363 A

(51) Int. Cl.

| | |
|---|---|
| ***G09G 5/36*** | (2006.01) |
| ***G09G 3/36*** | (2006.01) |
| ***G09G 5/397*** | (2006.01) |
| ***G09G 5/10*** | (2006.01) |
| ***G06F 15/80*** | (2006.01) |
| ***G06F 12/00*** | (2006.01) |
| ***H04N 7/01*** | (2006.01) |

(52) U.S. Cl. ........ 345/560; 345/100; 345/505; 345/546; 345/564; 345/690; 348/447

(58) Field of Classification Search .................. 345/560
See application file for complete search history.

(56) References Cited

U.S. PATENT DOCUMENTS

| | | | | |
|---|---|---|---|---|
| 6,320,619 | B1 * | 11/2001 | Jiang | 348/447 |
| 2006/0022987 | A1 * | 2/2006 | Rai et al. | 345/564 |
| 2007/0176881 | A1 * | 8/2007 | Lin | 345/100 |
| 2007/0263005 | A1 * | 11/2007 | Huang et al. | 345/546 |
| 2008/0079735 | A1 * | 4/2008 | Selwan et al. | 345/505 |
| 2009/0167790 | A1 * | 7/2009 | Lin et al. | 345/690 |

* cited by examiner

*Primary Examiner* — David T Welch
*Assistant Examiner* — Matthew D Salvucci
(74) *Attorney, Agent, or Firm* — Muncy, Geissler, Olds & Lowe, PLLC

(57) ABSTRACT

An image display device includes a timing controller capable of overdriving. The timing controller has three line buffers, an image reverse processing unit, and an overdrive unit. The first line buffer buffers first line data of a second frame, wherein the second frame is generated later than a first frame. The second line buffer buffers first compressed data. The image reverse processing unit estimates first and second line data of the first frame according to the first compressed data. According to the first and second line data of the first and second frames, the overdrive unit outputs first and second lines of interleaving data for an interleaving frame. The interleaving frame is inserted between the first and second frames. With the third line buffer, the timing controller outputs the first and second lines of interleaving data at different time point.

15 Claims, 6 Drawing Sheets

500

| $F_N \backslash F_P$ | 0 | 32 | 64 | 96 | 128 | 160 | 192 | 208 | 224 | 240 | 255 |
|---|---|---|---|---|---|---|---|---|---|---|---|
| 0 | 0 | 0 | 0 | 0 | 0 | 0 | 0 | 0 | 0 | 0 | 0 |
| 32 | LUT_01 | 32 | LUT_21 | LUT_31 | LUT_41 | LUT_51 | LUT_61 | X | LUT_81 | LUT_91 | LUT_A1 |
| 64 | LUT_02 | LUT_12 | 64 | LUT_32 | LUT_42 | LUT_52 | LUT_62 | X | LUT_82 | LUT_92 | LUT_A2 |
| 96 | LUT_03 | LUT_13 | LUT_23 | 96 | LUT_43 | LUT_53 | LUT_63 | X | LUT_83 | LUT_93 | LUT_A3 |
| 128 | LUT_04 | LUT_14 | LUT_24 | LUT_34 | 128 | LUT_54 | LUT_64 | X | LUT_84 | LUT_94 | LUT_A4 |
| 160 | LUT_05 | LUT_15 | LUT_24 | LUT_35 | LUT_45 | 160 | LUT_65 | X | LUT_85 | LUT_95 | LUT_A5 |
| 192 | LUT_06 | LUT_16 | LUT_25 | LUT_36 | LUT_46 | LUT_56 | 192 | LUT_76 | LUT_86 | LUT_96 | LUT_A6 |
| 208 | X | X | X | X | X | X | LUT_67 | 208 | LUT_87 | LUT_97 | LUT_A7 |
| 224 | LUT_08 | LUT_18 | LUT_28 | LUT_38 | LUT_48 | LUT_58 | LUT_68 | LUT_78 | 224 | LUT_98 | LUT_A8 |
| 240 | X | X | X | X | X | X | LUT_69 | LUT_79 | LUT_89 | 240 | LUT_A9 |
| 255 | 255 | 255 | 255 | 255 | 255 | 255 | 255 | 255 | 255 | 255 | 255 |

FIG. 6

IMAGE DISPLAY DEVICE

CROSS REFERENCE TO RELATED APPLICATIONS

This Application claims priority of Taiwan Patent Application No. 097151363, filed on Dec. 30, 2008, the entirety of which is incorporated by reference herein.

BACKGROUND OF THE INVENTION

1. Field of the Invention

The present invention relates to image display devices, and in particular relates to image display devices with overdrive capability.

2. Description of the Related Art

Image persistence may occur for a low video frame rate.

To increase the video frame rate, several overdrive techniques have been developed.

FIG. 1 depicts a conventional overdrive technique, wherein between two successive frames—a first frame $F_P$ and a second frame $F_N$—a black frame is interleaved therebetween as an interleaving frame $F_I$. The interleaving technique increases the frame rate of the video and mitigates image persistence of the first frame $F_P$.

The black frame interleaving technique, however, has some drawbacks. Mainly, the brightness of the video is reduced by the interleaved black frames and videos appear dim in color.

Thus, the invention discloses new overdrive techniques. Instead of interleaving black frames into the video, the overdrive technique of the invention performs calculations on the original video to generate proper frames to be interleaved into the original video. Thus, brightness of the video is not affected like the conventional overdrive technique.

BRIEF SUMMARY OF THE INVENTION

The invention discloses image display devices. The image display device comprises a timing controller built with an overdrive technique. The timing controller is positioned prior to a driver of a panel of the image display device. Synchronous signals for panel driving (such as vertical synchronization signal $V_{sync}$ or horizontal synchronization signal $H_{sync}$) and interleaving frames to be inserted between the original frames are provided by the timing controller.

To generate an interleaving frame to be inserted between a first and a second frame, the timing controllers of the invention uses a first, a second and a third line buffer, an image reverse processing unit and an overdrive unit.

In a case wherein the second frame is generated later than the first frame, first line data of the second frame is buffered in the first line buffer, and first compressed data, compressed from first and second line data of the first frame, is buffered in the second line buffer.

The image reverse processing unit receives the first compressed data from the second line buffer to estimate the first and second line data of the first frame.

Based on the estimated first line data of the first frame and the buffered first line data of the second frame, the overdrive unit generates interleaving data of a first line. Furthermore, based on the estimated second line data of the first frame and currently received second line data of the second frame, the overdrive unit generates interleaving data of a second line. The interleaving data of the first line is outputted as second line data of an interleaving frame while the interleaving data of the second line is sent to the third line buffer. The interleaving data of the second line is buffered in the third line buffer until third line data of the second frame is sent into the timing controller. When the currently received line data is the third line data of the second frame, the interleaving data of the second line is sent out as third line data of the interleaving frame.

In addition to the aforementioned components, another exemplary embodiment of the timing controllers of the invention further comprises an image processing unit, a first memory, a motion detector, a first multiplexer, and a second multiplexer.

The image processing unit receives the currently entered second line data of the second frame and retrieves the first line buffer for the first line data of the second frame. The image processing unit compressed the first and second line data of the second frame to generate second compressed data, and stores the second compressed data in the first memory. Furthermore, the second compressed data is sent to the motion detector to be compared with the first compressed data buffered in the second line buffer to generate a control signal.

Instead of directly using the first and second lines of interleaving data to form the interleaving frame, the first and second line data of the second frame may be applied to form the interleaving frame. The interleaving data of the first line and the first line data of the second frame are sent to the first multiplexer, and the interleaving data of the second line and the second line data of the second frame are sent to the second multiplexer. The first and second multiplexers work according to the control signal provided by the motion detector. The outputs of the first and second multiplexers are used to form the interleaving frame.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 6 shows an exemplary embodiment of the LUT of the invention.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1:
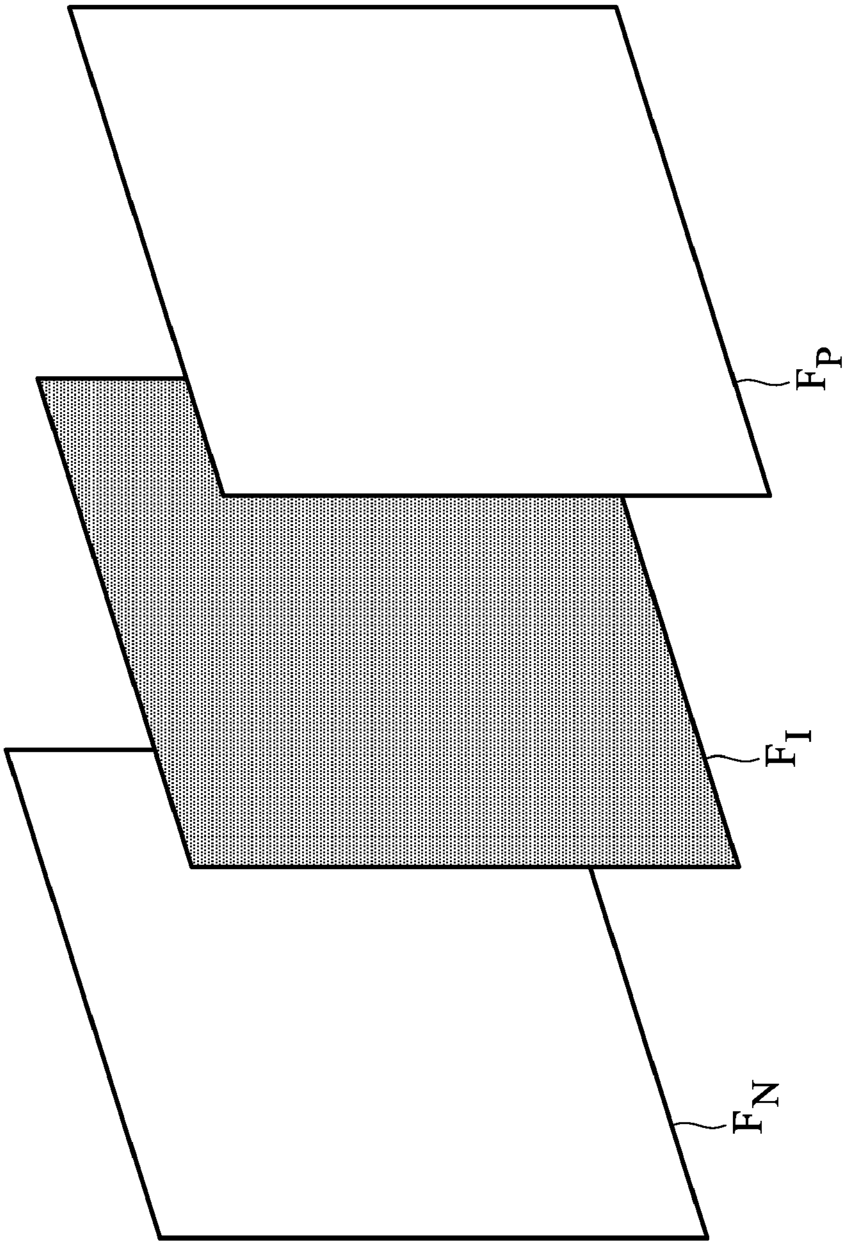
FIG. 1 ( PRIOR ART )
FIG. 1 depicts a conventional overdrive technique.
Figure 2:
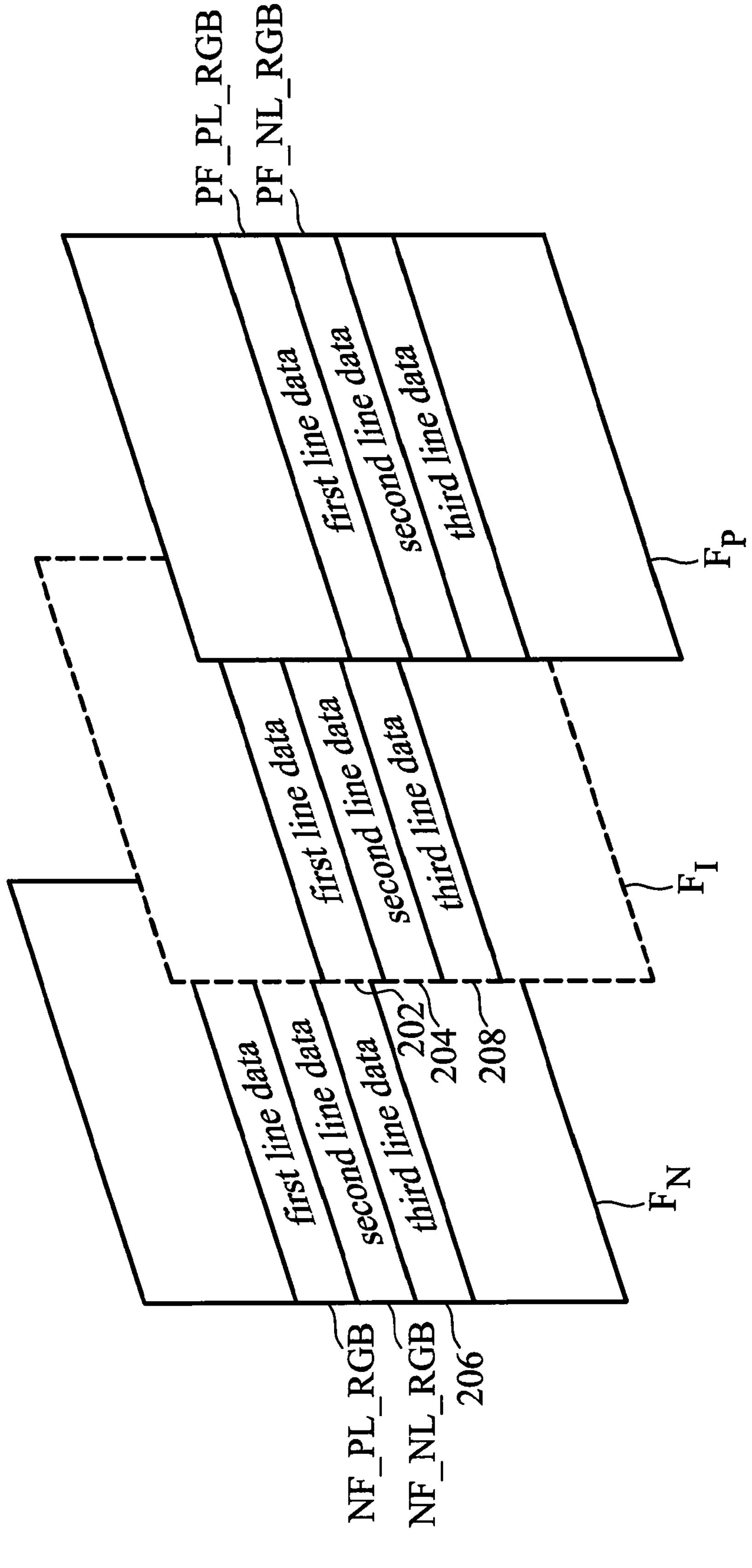
FIG. 2 depicts two continuous frames $F_P$, $F_N$ and an interleaving frame $F_I$.

FIG. 2 depicts two continuous frames—a first frame $F_P$ and a second frame $F_N$—and an interleaving frame $F_I$. The second frame $F_N$ is generated later than the first frame $F_P$. The interleaving frame $F_I$ is generated by the timing controller of the invention to be inserted between the first and second frames $F_P$ and $F_N$.

The invention builds the overdrive technique in a timing controller of an image display driver. The timing controller is positioned prior to a panel driver, and generates the interleaving frame $F_I$ before the panel driver drives the panel.

Figure 3:
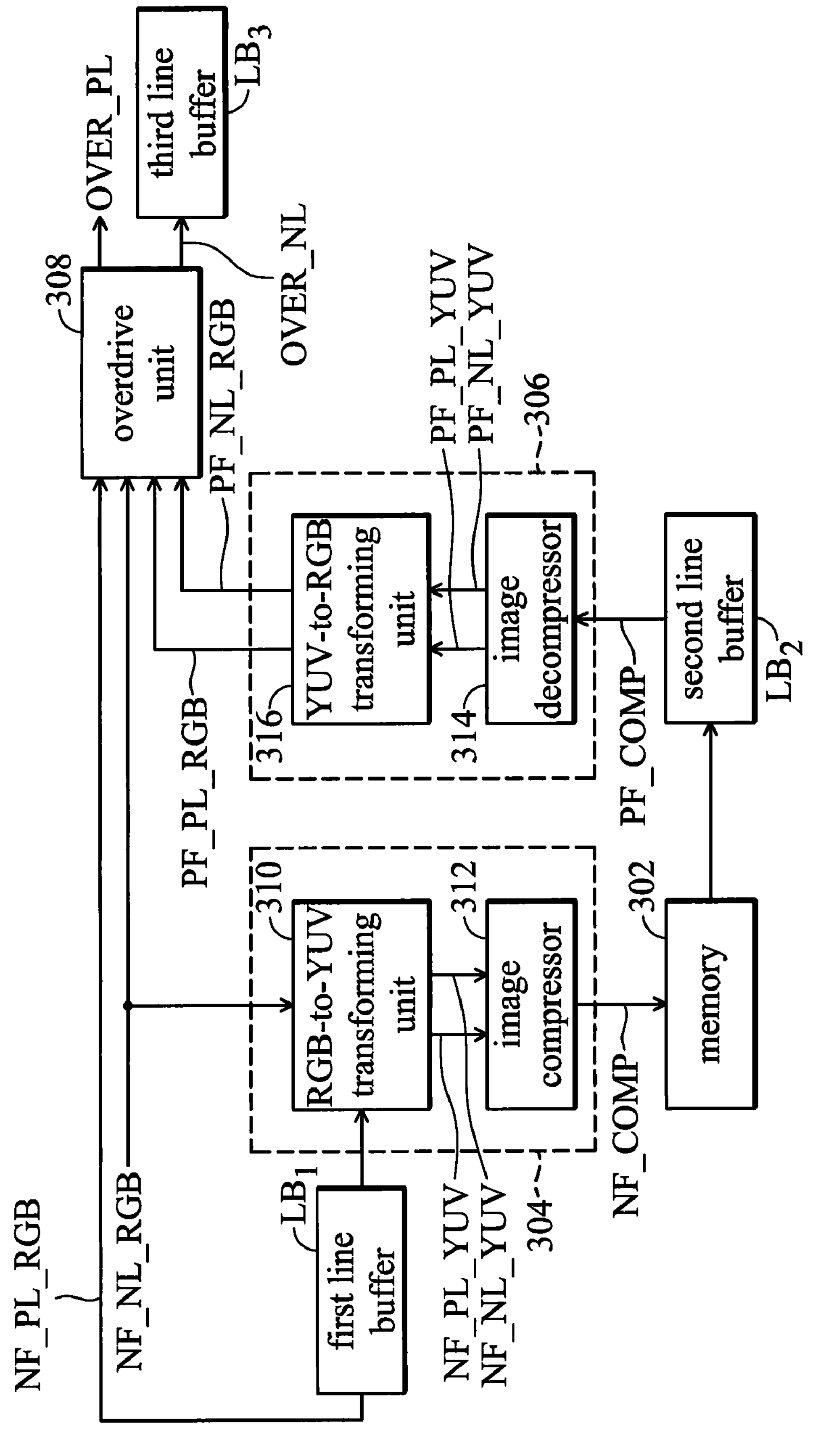
FIG. 3 depicts an exemplary embodiment of the timing controllers of the invention.

The timing controller may perform distinct operations when receiving odd row inputs and even row inputs. Referring to FIG. 3, the timing controller of the invention comprises three line buffers $LB_1$, $LB_2$ and $LB_3$. When the input line data belongs to an odd row, the first, second and third line buffers $LB_1$, $LB_2$ and $LB_3$ may all be triggered, wherein the first and second buffers $LB_1$ and $LB_2$ refresh data therein, and the third line buffer $LB_3$ is retrieved to form the interleaving frame. The other components shown in FIG. 3 may be triggered when the input line data belongs to an even row. Furthermore, the third buffer $LB_3$ may be refreshed when the input line data belongs to an even row.

FIG. 3 shows how the timing controller works, wherein the input line data, NF_NL_RGB, belongs to an even row. The reference of the data shown in FIG. 3 can be found in FIG. 2. Referring to FIG. 3, the even row input is second line data NF_NL_RGB of the second frame $F_N$. Before the second line data NF_NL_RGB of the second frame $F_N$ enters the timing controller, an odd row data—first line data NF_PL_RGB of the second frame $F_N$—was entered to the timing controller and has been buffered by the first line buffer $LB_1$, first compressed data PF_COMP including compressed information about first and second line data of the first frame $F_P$ has been buffered by the second line buffer $LB_2$, and the third line buffer $LB_3$ was retrieved to provide data therein as first line data 202 of the interleaving frame $F_I$.

As shown in FIG. 3, when the second line data NF_NL_RGB of the second frame $F_N$ is entered to the timing controller, the image reverse processing unit 306 estimates first line data PF_PL_RGB and second line data PF_NL_RGB of the first frame $F_P$ according to the first compressed data PF_COMP retrieved from the second line buffer $LB_2$. The overdrive unit 308 generates interleaving data of a first line, OVER_PL, according to the first line data PF_PL_RGB of the first frame $F_p$ (received from the image reverse processing unit 306) and the first line data NF_PL_RGB of the second frame $F_N$ (retrieved from the first line buffer $LB_1$), and generates interleaving data of a second line, OVER_NL, according to the second line data PF_NL_RGB of the first frame $F_p$ (received from the image reverse processing unit 306) and the second line data NF_NL_RGB of the second frame $F_N$ (the line data currently inputted to the timing controller). The interleaving data of the second line, OVER_NL, is buffered in the third line buffer $LB_3$ while the interleaving data of first line, OVER_PL, is outputted as the second line data 204 of the interleaving frame $F_I$. The interleaving data of the second line, OVER_NL, is buffered in the third line buffer $LB_3$ until the next odd row input (third line data 206 of the second frame $F_N$) is sent into the timing controller. At that time, the interleaving data of the second line, OVER_NL, is outputted from the third line buffer $LB_3$ as the third line data 208 of the interleaving frame $F_I$.

FIG. 3 further discloses a memory 302 and an image processing unit 304. The image processing unit 304 works as a compressor and the memory 302 stores the compressed data. The data buffered in the second line buffer $LB_2$ come from the memory 302.

As shown in FIG. 3, when the second line data NF_NL_RGB of the second frame $F_N$ enters the timing controller, the image processing unit 304 not only receives it but also retrieves the first line buffer $LB_1$ for the first line data NF_PL_RGB of the second frame $F_N$. According to the first and second line data NF_NL_RGB and NF_PL_RGB of the second frame $F_N$, the image processing unit 304 generates second compressed data NF_COMP and stores them in the memory 302. The memory 302 collects the compressed data of the second frame $F_N$ and, when the timing controller ends the processing of the second frame $F_N$ and proceeds to process a third frame generated later than the second frame $F_N$, the memory 302 provides the second line buffer $LB_2$ with the compressed data of the second frame $F_N$ for interleaving a frame between the second frame $F_N$ and the third frame. For example, the memory 302 provides the second line buffer $LB_2$ with the second compressed data NF_COMP when the timing controller is processing the third frame and the first line buffer $LB_1$ is refreshed with first line data of the third frame.

In FIG. 3, the first frame $F_P$ has been compressed and stored in the memory 302. Therefore, the memory 302 can provide the second line buffer $LB_2$ with the compressed data of the first frame $F_P$ to generate the interleaving frame $F_I$ between the first frame $F_P$ and the second frame $F_N$.

The memory 302 may be any memory device with high-speed access. For example, the memory 302 may be realized by a synchronous dynamic random access memory (SDRAM).

FIG. 3 further shows exemplary embodiments of the image processing unit 304 and the image reverse processing unit 306. As shown, the image processing unit 304 comprises an RGB-to-YUV transforming unit 310 and an image compressor 312; and the image reverse processing unit 306 comprises an image decompressor 314 and a YUV-to-RGB transforming unit 316.

The RGB-to-YUV transforming unit 310 transforms the first and second line data NF_PL_RGB and NF_NL_RGB of the second frame $F_N$ from an RGB format to a YUV format. The transformed YUV format line data NF_PL_YUV and NF_NL_YUV are sent to the image compressor 312 to be compressed to the second compressed data NF_COMP.

The image decompressor 314 decompresses the first compressed data PF_COMP to the first and second line data PF_PL_YUV and PF_NL_YUV of the first frame $F_P$, wherein the decompressed data PF_PL_YUV and PF_NL_YUV are in the YUV format. The YUV-to-RGB transforming unit 316 transforms the YUV format data PF_PL_YUV and PF_NL_YUV to RGB format data PFPL_RGB and PF_NL_RGB.

Figure 4:
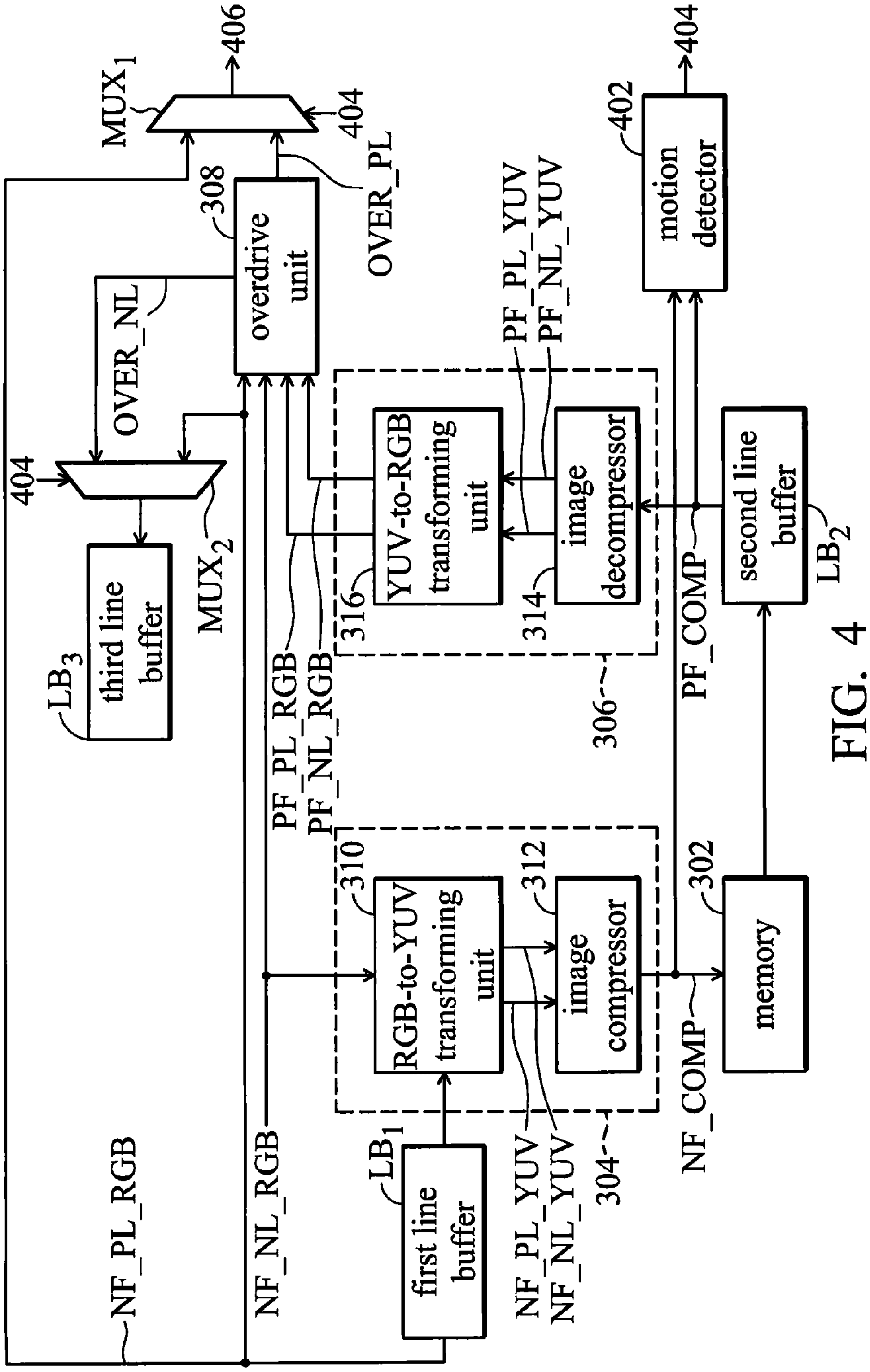
FIG. 4 depicts another exemplary embodiment of the timing controllers of the invention.

FIG. 4 depicts another exemplary embodiment of the timing controllers of the invention. Compared to the aforementioned timing controllers, the technique disclosed by FIG. 4 further discloses motion detection. As the signals in FIG. 4 shown, an even line input, the second line data NF_NL_RGB of the second frame $F_N$, is inputted to the timing controller.

Compared with FIG. 3, FIG. 4 further comprises a motion detector 402 and two multiplexers $Mux_1$ and $Mux_2$. The motion detector 402 compares the first compressed data PF_COMP and the second compressed data NF_COMP to generate a control signal 404. The multiplexers $Mux_1$ and $Mux_2$ may both work according to the control signal 404. According to the control signal 404, the multiplexer $Mux_1$ outputs the interleaving data of the first line, OVER_PL, or the first line data NF_PL_RGB of the second frame $F_N$ to be the second line data 204 of the interleaving frame $F_I$. According to the control signal 404, the multiplexer $Mux_2$ outputs interleaving data of the second line, OVER_NL, or the second line data NF_NL_RGB of the second frame $F_N$ to be buffered by the third line buffer $LB_3$. The data buffered by the third line buffer $LB_3$ is output to form the third line data 208 of the interleaving frame $F_I$ when the timing controller proceeds with the processing of the third line data 208 of the second frame $F_N$.

This paragraph discusses the operation of the motion detector 402. When the difference between the first compressed data OVER_PL and the second compressed data OVER_NL is greater than a threshold value, the motion detector 402 sets the control signal 404 to be a first value, and the multiplexers $Mux_1$ and $Mux_2$ output the first and second lines of interleaving data OVER_PL and OVER_NL, respectively, to form the interleaving frame $F_I$. When the difference between the first compressed data OVER_PL and the second compressed data OVER_NL is smaller than the threshold value, the motion detector 402 sets the control signal 404 to be a second value, and the multiplexers $Mux_1$ and $Mux_2$ output the first and second line data NF_PL_RGB and NF_NL_RGB of the second frame $F_N$, respectively, to form the interleaving frame $F_I$.

Figure 5:
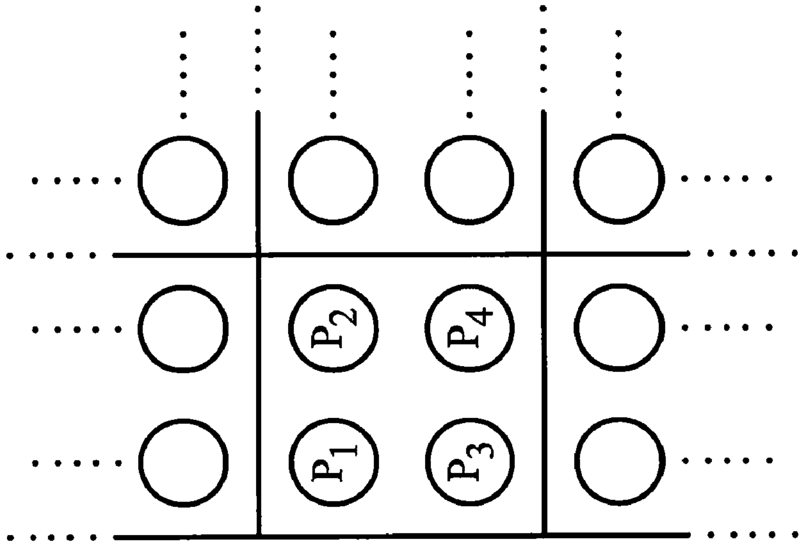
FIG. 5 depicts 2×2 pixel blocks for an exemplary embodiment of compression/decompression techniques of the invention.

This paragraph discusses the image compression and decompression of the image compressor and decompressor 312 and 314. As shown in FIG. 5, the compression/decompression of the invention may divide one frame into a plurality of 2×2 pixel blocks. Each 2×2 pixel block has four pixels $P_1$, $P_2$, $P_3$ and $P_4$. The Y, U and V data of the pixels $P_1$, $P_2$, $P_3$ and $P_4$ are:

$P_1$: $Y_1[7:0]$, $U_1[7:0]$ and $V_1[7:0]$;

$P_2$: $Y_2[7:0]$, $U_2[7:0]$ and $V_2[7:0]$;

$P_3$: $Y_3[7:0]$, $U_3[7:0]$ and $V_3[7:0]$; and $P_4$: $Y_4[7:0]$, $U_4[7:0]$ and $V_4[7:0]$.

The image compressor 312 may perform the following calculations on the aforementioned data:

$COMP_1[15:6]=\{Y_1[7:3], Y_2[7:3]\}$;

$COMP_1[5:0]=AverU[7:2]$;

$COMP_2[15:6]=\{Y_3[7:3], Y_4[7:3]\}$; and $COMP_2[5:0]=AverV[7:2]$, where $COMP_1$ and $COMP_2$ represent compressed data; $AverU[7:0]=[U_1+U_2+U_3+U_4]/4$; and $AverV[7:0]=[V_1+V_2+V_3+V_4]/4$. Furthermore, the imagedecompressor 314 may perform the following calculations on the compressed data:

$Y_1[7:0]=\{COMP_1[15:11], COMP_1[15:13]\}$;

$Y_2[7:0]=\{COMP_1[10:6], COMP_1[10:8]\}$;

$Y_3[7:0]=\{COMP_2[15:11], COMP_2[15:13]\}$;

$U_1[7:0]=\{COMP_1[5:0], COMP_1[5:4]\}=U_2=U_3=U_4$; and $V_1[7:0]=\{COMP_2[5:0], COMP_2[5:4]\}=V_2=V_3=V_4$.

Note that the aforementioned formulations are not intended to limit the scope of the compression/decompression techniques of the invention, and may be replaced by other compression/decompression techniques.

The overdrive unit 308 may use interpolation techniques or a lookup table (LUT) to get the interleaving data of the first or second line, OVER_PL or OVER_NL. In the LUT case, the overdrive unit 308 may comprise a memory to store the LUT. FIG. 6 shows an exemplary embodiment of the LUT, which includes variables LUT_01~LUT98 and LUT_A1~LUT_A9, wherein users can set the values thereof. The LUT shown in FIG. 6 may be stored in an Electrically-Erasable Programmable Read-Only Memory (EEPROM).

Instead of the LUT technique, the overdrive unit 308 may use weighting techniques to generate enhanced interleaving data for the pixels in the center of the frame.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image display device comprising a timing controller, wherein the timing controller comprises:

a first line buffer having a first line data of a second frame, wherein the second frame is generated later than a first frame;

a second line buffer, wherein first compressed data is buffered therein;

a third line buffer;

an image reverse processing unit retrieving the first compressed data from the second line buffer to estimate first line data and second line data of the first frame; and an overdrive unit generating interleaving data of a first line according to the estimated first line data of the first frame and the buffered first line data of the second frame, and generating interleaving data of a second line according to the estimated second line data of the first frame and second line data of the second frame that is currently entered in the timing controller, wherein the interleaving data of the first line is output to form second line data of an interleaving frame, wherein the interleaving data of the second line is buffered by the third line buffer.

2. The image display device as claimed in claim 1, wherein the third line buffer outputs the interleaving data of the second line as third line data of the interleaving frame when the first line buffer is refreshed to buffer third line data of the second frame.

3. The image display device as claimed in claim 1, further comprising:

a first memory; and an image processing unit receiving the second line data of the second frame and retrieving the first line buffer for the first line data of the second frame to generate second compressed data, and storing the second compressed data in the first memory.

4. The image display device as claimed in claim 3, wherein the first memory provides the second line buffer with the second compressed data when the first line buffer is refreshed with first line data of a third frame, wherein the third frame is generated later than the second frame.

5. The image display device as claimed in claim 4, wherein the first memory is a synchronous dynamic random access memory (SDRAM).

6. The image display device as claimed in claim 1, wherein the overdrive unit comprises a second memory storing a table for generating the interleaving data of the first or the second line.

7. The image display device as claimed in claim 3, wherein the image processing unit comprises:

an RGB-to-YUV transforming unit transforming the first and second line data of the second frame from an RGB format to an YUV format; and an image compressor compressing the YUV format first line data and the YUV format second line data of the second frame to generate the second compressed data.

8. The image display device as claimed in claim 7, wherein the image reverse processing unit comprises:

an image decompressor decompressing the first compressed data to output YUV format first line data of the first frame and YUV format second line data of the first frame; and a YUV-to-RGB transforming unit transforming the YUV format first line data and the YUV format second line data of the first frame to the RGB format.

9. An image display device comprising a timing controller, wherein the timing controller comprises:

a first memory;

a first line buffer having a first line data of a second frame is buffered therein, the second frame is generated later than a first frame;

a second line buffer, wherein first compressed data is buffered therein;

a third line buffer;

an image processing unit receiving second line data of the second frame that is currently entered in the timing controller and, retrieving the first line buffer for the first line data of the second frame to generate second compressed data to be stored in the first memory;

an image reverse processing unit retrieving the first compressed data from the second line buffer to estimate first line data and second line data of the first frame;

a motion detector comparing the first and second compressed data to generate a control signal;

an overdrive unit generating interleaving data of a first line according to the estimated first line data of the first frame and the buffered first line data of the second frame, and generating interleaving data of a second line according to the estimated second line data of the first frame and the currently entered second line data of the second frame;

a first multiplexer receiving the interleaving data of the first line and the buffered first line data of the second frame, and outputting the interleaving data of the first line or the buffered first line data of the second frame to form second line data of an interleaving frame according to the control signal; and a second multiplexer receiving the interleaving data of the second line and the currently entered second line data of the second frame, and sending the interleaving data of the second line or the currently entered second line data of the second frame to the third line buffer according to the control signal.

10. The image display device as claimed in claim 9, wherein the third line buffer outputs the data therein as third line data of the interleaving frame when the first line buffer is refreshed with third line data of the second frame.

11. The image display device as claimed in claim 9, wherein the first memory provides the second line buffer with the second compressed data when the first line buffer is refreshed with first line data of a third frame, the third frame is generated later than the second frame.

12. The image display device as claimed in claim 11, wherein the first memory is a synchronous dynamic random access memory (SDRAM).

13. The image display device as claimed in claim 9, wherein the overdrive unit comprises a second memory storing a table for generating the interleaving data of the first line or the interleaving data of the second line.

14. The image display device as claimed in claim 9, wherein the image processing unit comprises:

an RGB-to-YUV transforming unit transforming the first and second line data of the second frame from an RGB format to an YUV format; and an image compressor compressing the YUV format first line data and the YUV format second line data of the second frame to generate the second compressed data.

15. The image display device as claimed in claim 14, wherein the image reverse processing unit comprises:

an image decompressor decompressing the first compressed data to output YUV format first line data of the first frame and YUV format second line data of the first frame; and a YUV-to-RGB transforming unit transforming the YUV format first line data and the YUV format second line data of the first frame to the RGB format.

* * * * *